United States Patent
Shirakawa

(10) Patent No.: US 9,549,112 B2
(45) Date of Patent: Jan. 17, 2017

(54) IMAGE CAPTURING APPARATUS, AND CONTROL METHOD THEREFOR

(71) Applicant: CANON KABUSHIKI KAISHA, Tokyo (JP)

(72) Inventor: Yusuke Shirakawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 60 days.

(21) Appl. No.: 14/707,522

(22) Filed: May 8, 2015

(65) Prior Publication Data

US 2015/0334281 A1    Nov. 19, 2015

(30) Foreign Application Priority Data

May 13, 2014   (JP) ................................ 2014-099832

(51) Int. Cl.
*H04N 5/232*    (2006.01)

(52) U.S. Cl.
CPC ............ *H04N 5/232* (2013.01); *H04N 5/2328* (2013.01); *H04N 5/23258* (2013.01)

(58) Field of Classification Search
CPC .. H04N 5/232; H04N 5/23258; H04N 5/2328; H04N 5/23287
See application file for complete search history.

(56) References Cited

U.S. PATENT DOCUMENTS

| | | | | |
|---|---|---|---|---|
| 7,436,434 | B2* | 10/2008 | Shibutani | G03B 17/02 348/207.99 |
| 2004/0101161 | A1* | 5/2004 | Roh | G05D 1/0246 382/103 |
| 2006/0010699 | A1* | 1/2006 | Tamura | G01C 17/28 33/355 R |

(Continued)

FOREIGN PATENT DOCUMENTS

| | | |
|---|---|---|
| JP | 2000-032379 A | 1/2000 |
| JP | 2013-002886 A | 1/2013 |

(Continued)

OTHER PUBLICATIONS

A British Search Report issued on Oct. 23, 2015, that issued in the corresponding U.K. Patent Application No. GB1508123.5.

*Primary Examiner* — Roberto Velez
*Assistant Examiner* — Tuan Le
(74) *Attorney, Agent, or Firm* — Cowan, Liebowitz & Latman, P.C.

(57) ABSTRACT

There is provided an image capturing apparatus including a movable unit. An acceleration detection unit detects an acceleration of the image capturing apparatus. A geomagnetic detection unit detects geomagnetism. A determining unit determines a direction of the image capturing apparatus by using the acceleration detected by the acceleration detection unit and the geomagnetism detected by the geomagnetic detection unit. When determining the direction of the image capturing apparatus at a predetermined timing during an (Continued)

operation period of the movable unit, the determining unit determines the direction of the image capturing apparatus by using the acceleration detected by the acceleration detection unit before start of the operation period of the movable unit and the geomagnetism detected by the geomagnetic detection unit during the operation period of the movable unit.

11 Claims, 12 Drawing Sheets

(56) References Cited

U.S. PATENT DOCUMENTS

| | | | | |
|---|---|---|---|---|
| 2007/0229669 | A1* | 10/2007 | Yamamoto | H04N 5/232 348/207.99 |
| 2010/0125414 | A1* | 5/2010 | Okuyama | G01C 22/00 701/494 |
| 2010/0177198 | A1* | 7/2010 | Hayashi | G03B 5/00 348/208.2 |
| 2011/0007901 | A1* | 1/2011 | Ikeda | H04B 5/02 380/270 |
| 2012/0062414 | A1* | 3/2012 | Sambongi | G01C 21/165 342/357.25 |
| 2012/0078571 | A1* | 3/2012 | Yamada | G01C 17/30 702/141 |
| 2012/0098982 | A1* | 4/2012 | Watanabe | H04N 5/23287 348/208.4 |
| 2012/0257084 | A1* | 10/2012 | Kiyoshige | H04N 5/23222 348/231.5 |
| 2012/0268621 | A1* | 10/2012 | Kanma | H04N 5/225 348/222.1 |
| 2013/0247117 | A1* | 9/2013 | Yamada | G08C 17/02 725/93 |

FOREIGN PATENT DOCUMENTS

| | | |
|---|---|---|
| JP | 2013-057601 A2 | 3/2013 |
| WO | 2013/069048 A1 | 5/2013 |
| WO | 2013/141435 A1 | 9/2013 |

* cited by examiner

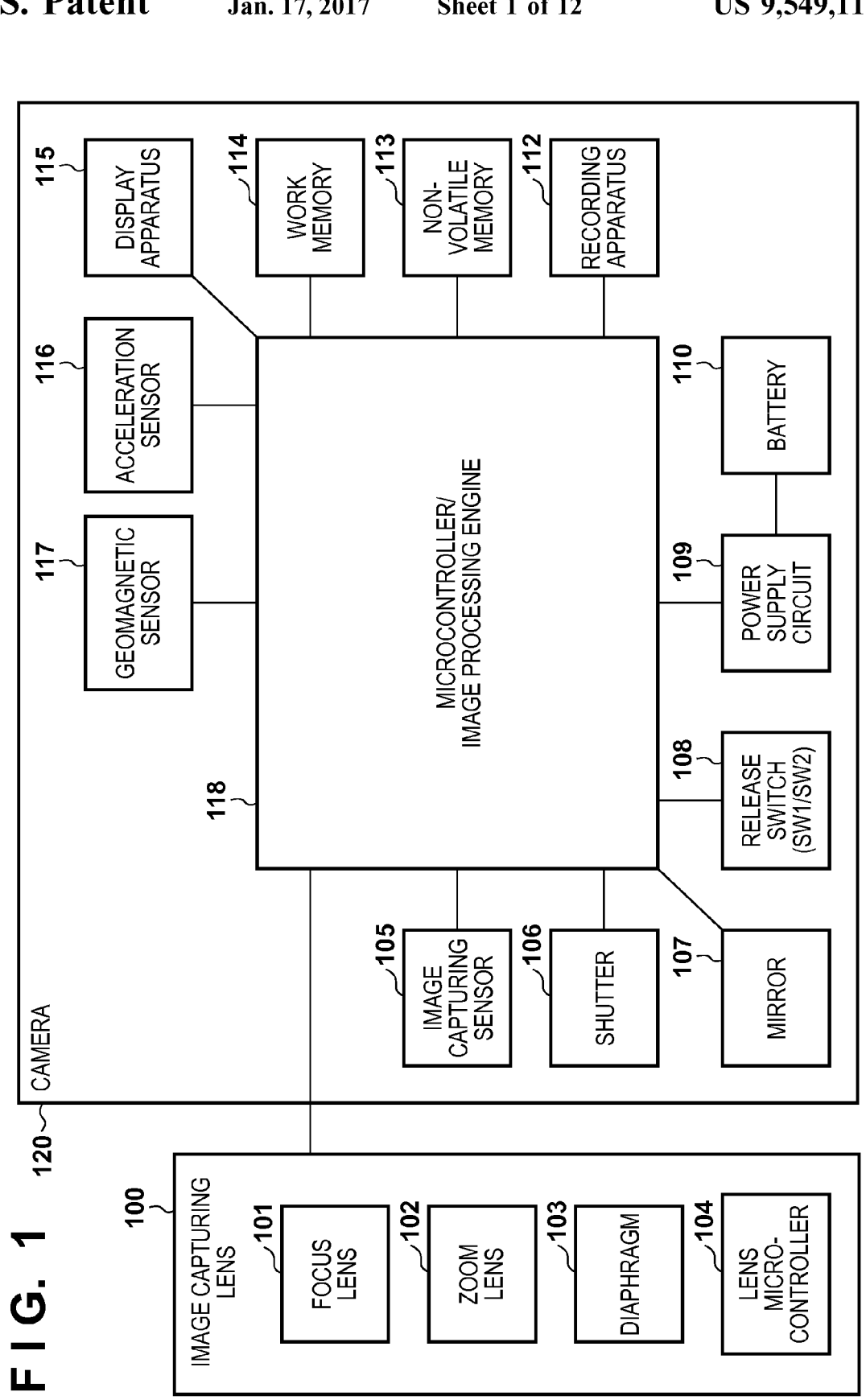

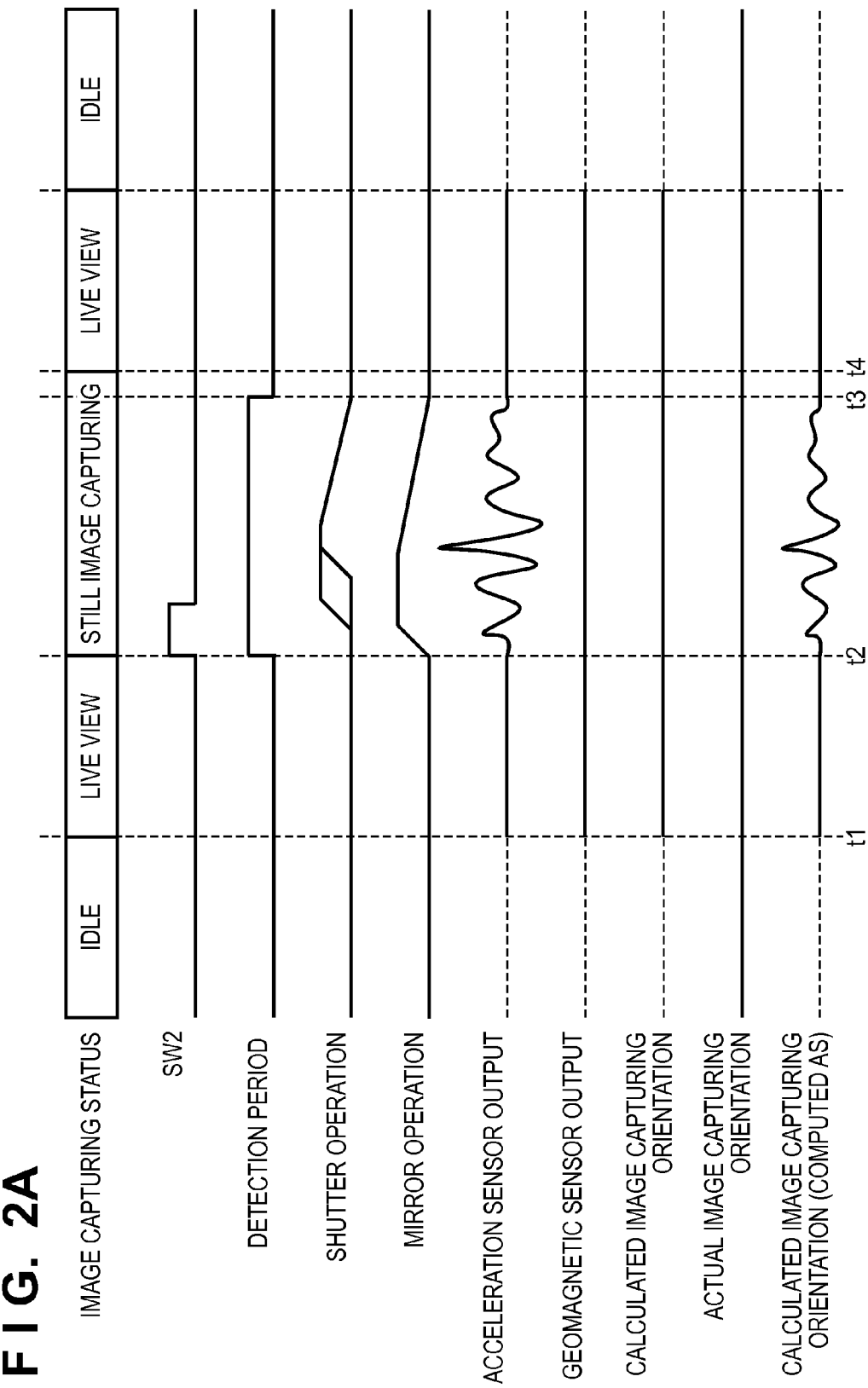

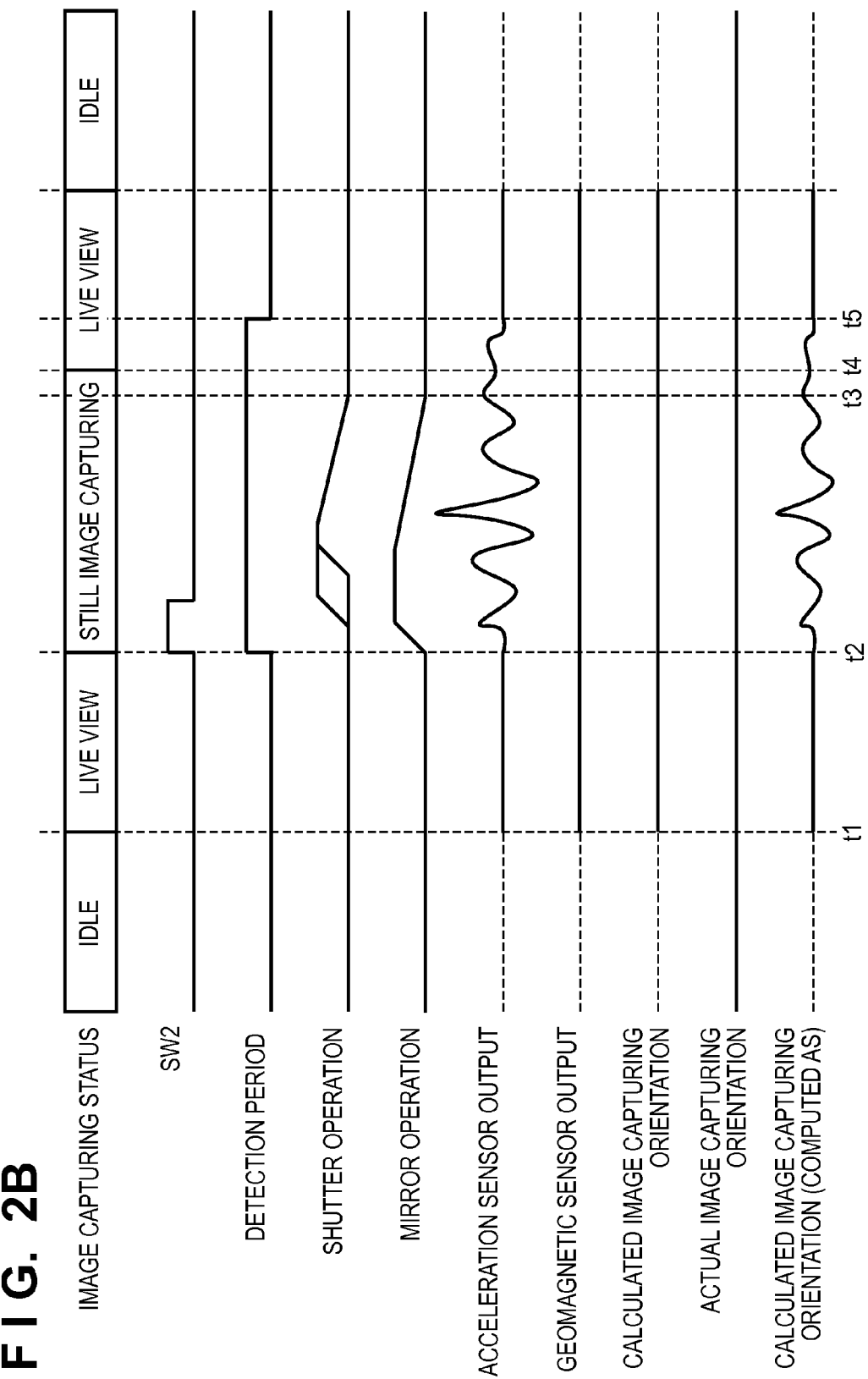

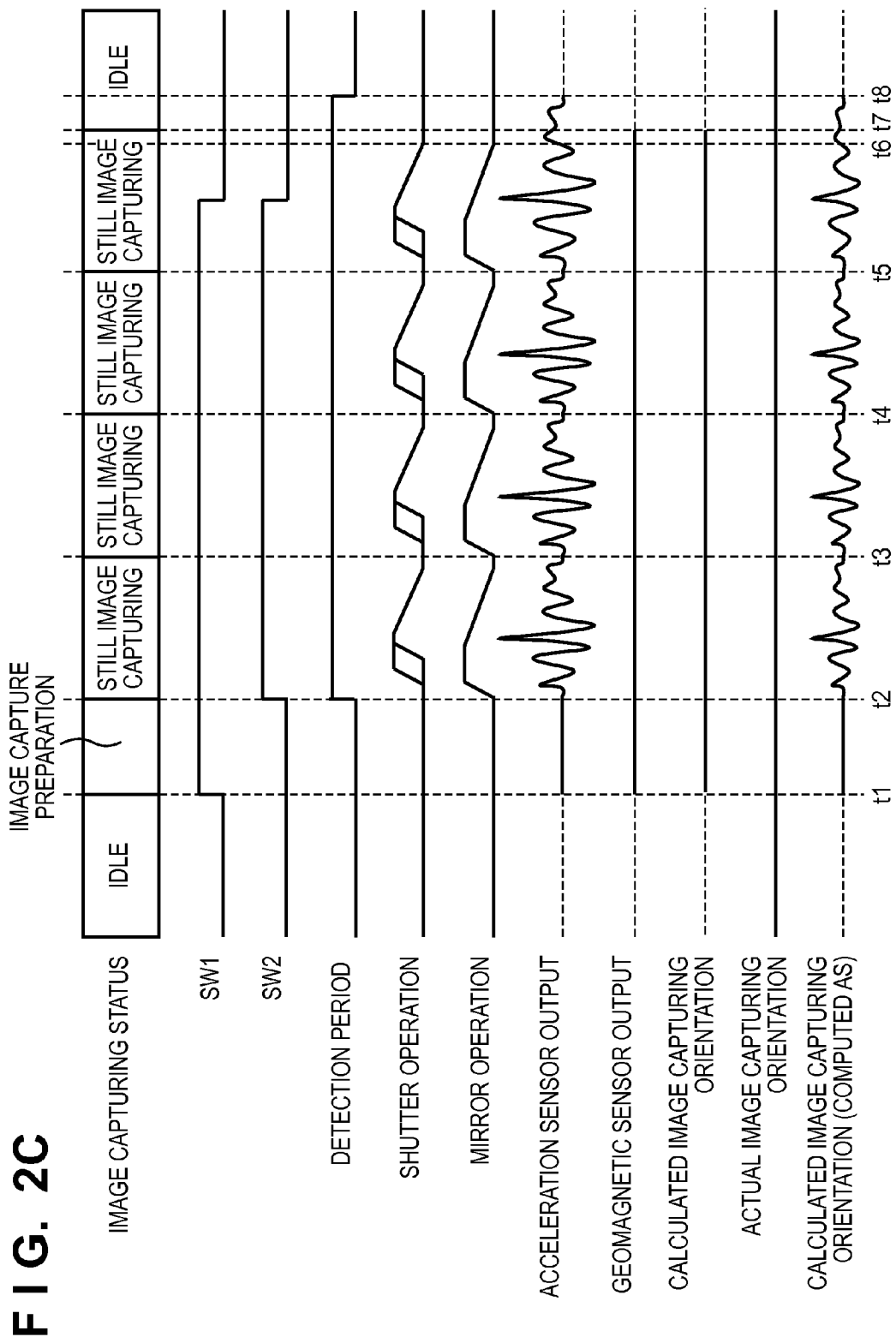

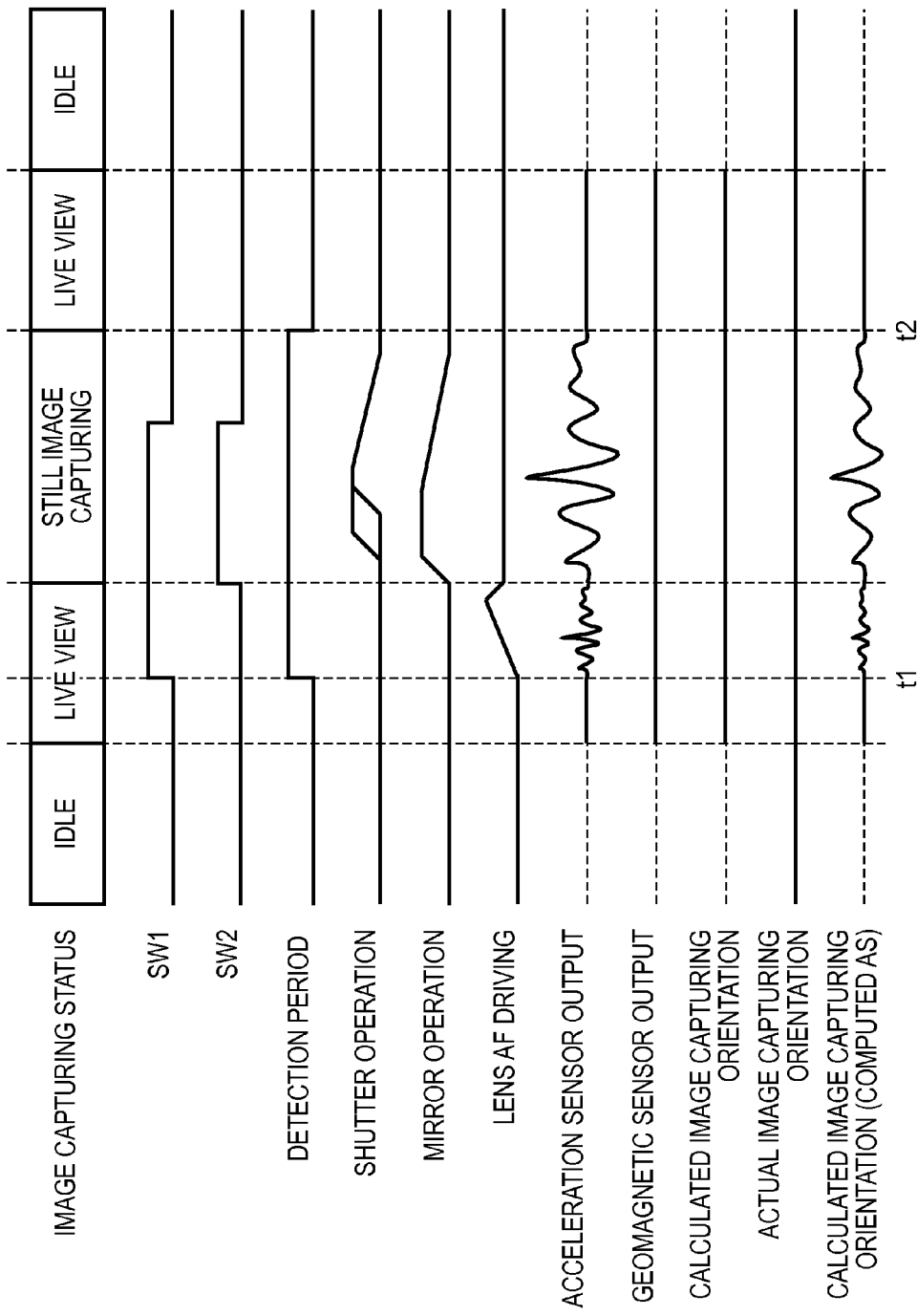

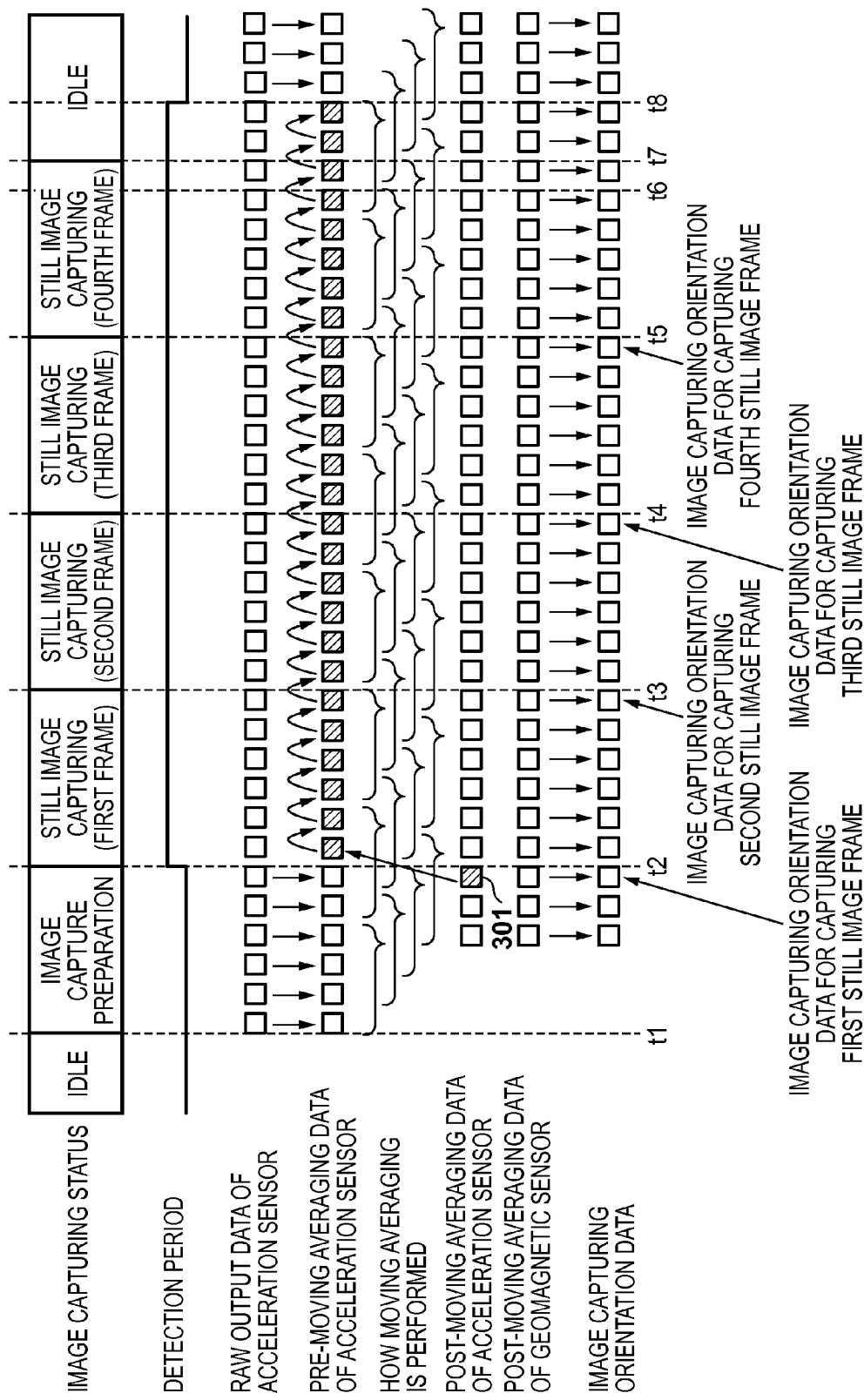

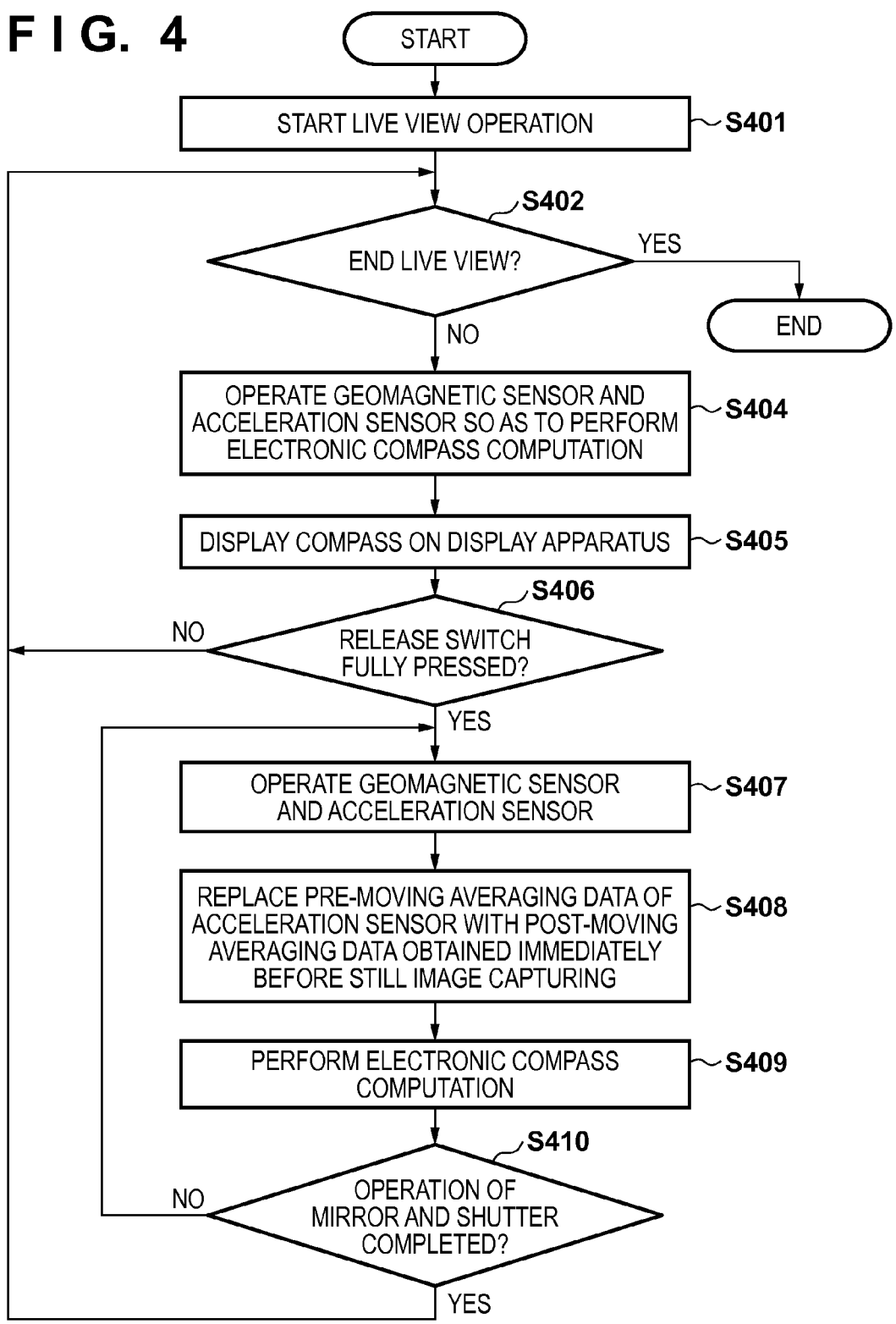

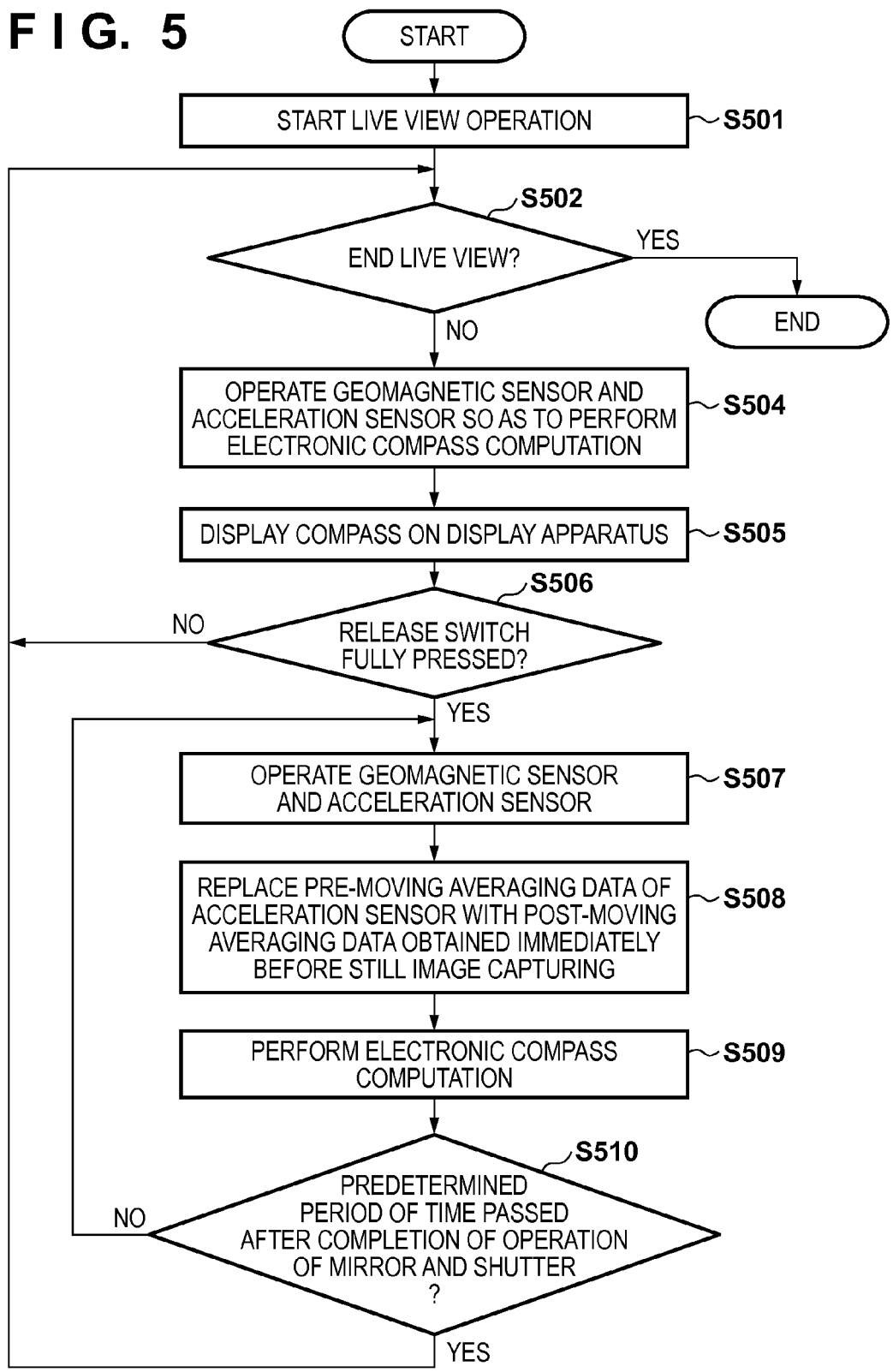

IMAGE CAPTURING APPARATUS, AND CONTROL METHOD THEREFOR

BACKGROUND OF THE INVENTION

Field of the Invention

The present invention relates to an image capturing apparatus, and a control method therefor.

Description of the Related Art

In recent years, there are increasing needs for the users of digital cameras to know the image capturing position and image capturing direction of photographs. And, a digital camera including an electronic compass that uses a geomagnetic sensor and an acceleration sensor, and having a function of saving the image capturing direction in association with a captured image, has come into practical use. For example, Japanese Patent Laid-Open No. 2000-32379 discloses a technique in which image information is associated with image capturing orientation information and image capturing field angle information, and a composite image having a wide field angle is generated from a plurality of images based on the associated information.

The electronic compass calculates orientation based on the outputs of the geomagnetic sensor and the acceleration sensor. Accordingly, if there is an obstacle that affects the magnetic field and the acceleration within the digital camera or in the digital camera system, in principle, the accuracy of the calculated orientation is reduced. Japanese Patent Laid-Open No. 2013-57601 proposes a method for avoiding this problem that arises in the geomagnetic sensor. Japanese Patent Laid-Open No. 2013-57601 discloses an electronic device including a geomagnetic detection unit, a change amount calculation unit that calculates the amount of change in magnetic orientation data, and an integration unit that integrates angular velocity so as to calculate angle data. With this electronic device, if the amount of change in magnetic orientation data and the angular velocity are within a threshold value range, the orientation is calculated using the geomagnetism. Otherwise, the orientation is calculated using the angular velocity in addition to the geomagnetism.

A digital camera, in particular, a single-lens reflex digital camera includes movable units such as a mirror and a shutter, and as a result of these units being moved at the time of image capturing, the acceleration sensor is affected, and the accuracy of the calculated orientation is reduced. However, Japanese Patent Laid-Open No. 2013-57601 merely discloses measures to reduce the influence on the geomagnetism, and does not disclose measures to reduce the influence on the acceleration.

SUMMARY OF THE INVENTION

The present invention has been made under the above-described situation, and provides a technique used in an image capturing apparatus including an electronic compass to suppress a reduction in the accuracy of the electronic compass caused by movable units such as a mirror and a shutter being operated.

According to an aspect of the present invention, there is provided an image capturing apparatus including a movable unit configured to operate so as to perform image capturing, the image capturing apparatus comprising: an acceleration detection unit configured to detect an acceleration of the image capturing apparatus; a geomagnetic detection unit configured to detect geomagnetism; and a determining unit configured to determine a direction of the image capturing apparatus by using the acceleration detected by the acceleration detection unit and the geomagnetism detected by the geomagnetic detection unit; wherein the determining unit is configured to, when determining the direction of the image capturing apparatus at a predetermined timing during an operation period of the movable unit, determine the direction of the image capturing apparatus by using the acceleration detected by the acceleration detection unit before start of the operation period of the movable unit and the geomagnetism detected by the geomagnetic detection unit during the operation period of the movable unit.

According to another aspect of the present invention, there is provided a control method for controlling an image capturing apparatus including a movable unit configured to operate so as to perform image capturing, the control method comprising: detecting an acceleration of the image capturing apparatus; detecting geomagnetism; and determining a direction of the image capturing apparatus by using the detected acceleration and the detected geomagnetism; wherein when determining the direction of the image capturing apparatus at a predetermined timing during an operation period of the movable unit, the direction of the image capturing apparatus is determined by using the acceleration detected before start of the operation period of the movable unit and the geomagnetism detected during the operation period of the movable unit.

Further features of the present invention will become apparent from the following description of embodiments with reference to the attached drawings.

BRIEF DESCRIPTION OF THE DRAWINGS

FIG. 1 is a block diagram showing a configuration of a digital single-lens reflex camera (image capturing system) according to a first embodiment.

FIG. 2A is a diagram showing operations of an electronic compass when capturing a single-frame still image after a live view operation according to the first embodiment.

FIG. 2B is a diagram showing operations of the electronic compass when capturing a single-frame still image after a live view operation according to a second embodiment.

FIG. 2C is a diagram showing operations of the electronic compass when capturing still images in succession after an idle state according to a third embodiment.

FIG. 2D is a diagram showing operations of the electronic compass when capturing a single-frame still image after a live view operation according to a fourth embodiment.

FIG. 3C is a diagram showing detailed operations of the electronic compass according to the third embodiment, which corresponds to the state shown in FIG. 2C.

FIG. 4 is a flowchart illustrating operations of a camera 120 according to the first embodiment.

FIG. 5 is a flowchart illustrating operations of a camera 120 according to the second embodiment.

DESCRIPTION OF THE EMBODIMENTS

Figure 3A:
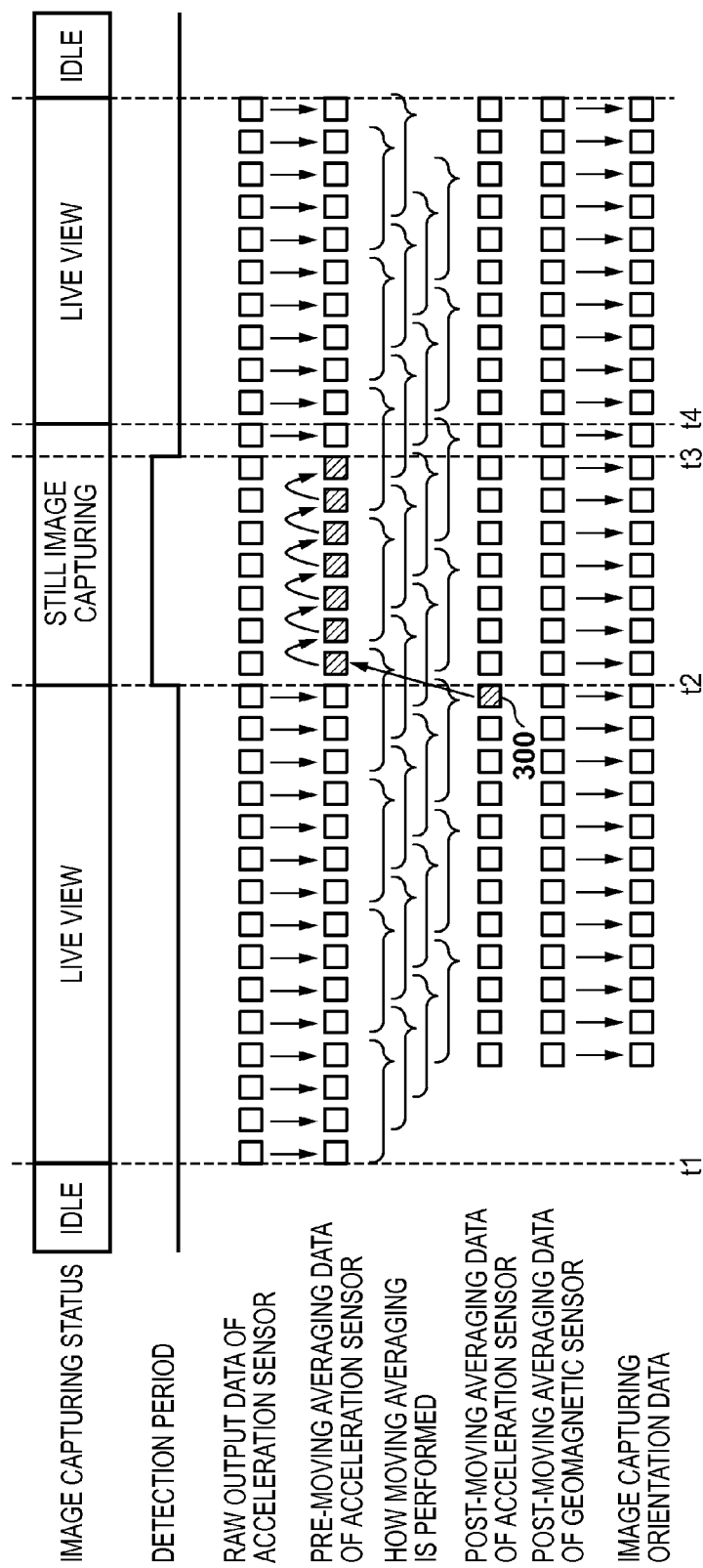
FIG. 3A is a diagram showing detailed operations of the electronic compass according to the first embodiment, which corresponds to the state shown in FIG. 2A.

Embodiments of the present invention will now be described with reference to the attached drawings. It should be noted that the technical scope of the present invention is defined by the claims, and is not limited by any of the embodiments described below. In addition, not all combinations of the features described in the embodiments are necessarily required for realizing the present invention. Each of the embodiments of the present invention described below can be implemented solely or as a combination of a plurality of the embodiments or features thereof where necessary or where the combination of elements or features from individual embodiments in a single embodiment is beneficial.

First Embodiment

FIG. 1 is a block diagram showing a configuration of a digital single-lens reflex camera (image capturing system) according to a first embodiment. The digital single-lens reflex camera includes an image capturing lens 100 and a camera 120 (image capturing apparatus). Hereinafter, a method for determining an image capturing orientation at the time of image capturing performed by a digital single-lens reflex camera will be described with reference to FIG. 1.

Insertion of a battery 110 into the camera 120 causes a power supply circuit 109 to perform operation, and power is thereby supplied to the camera 120. Next, a microcontroller/image processing engine 118 reads a program from a non-volatile memory 113, extracts the program into a work memory 114, and executes the program. Through this, the camera 120 is activated, and is ready for image capturing. In a state in which the camera 120 has been activated, if the user operates a zoom lever (not shown), the microcontroller/image processing engine 118 drives a zoom lens 102 so as to perform a zooming operation. If the user operates a release switch 108, an image capturing operation starts.

Upon the microcontroller/image processing engine 118 detecting that the release switch 108 has been operated, communication is established between the microcontroller/image processing engine 118 and a lens microcontroller 104. The microcontroller/image processing engine 118 thereby performs an AF/AE operation while driving a focus lens 101 in association with the image capturing lens 100. Upon completion of the AF/AE operation, the microcontroller/image processing engine 118 drives a diaphragm 103 and a mirror 107 according to the photometric value, and starts moving of a shutter 106. Substantially at the same time as the shutter 106 moves, the microcontroller/image processing engine 118 drives an image capturing sensor 105 so as to capture a subject. The captured image data is subjected to image processing by the microcontroller/image processing engine 118, then encoded in an image file format such as JPEG, and finally recorded in a recording apparatus 112 as an image file.

In parallel to the image capturing operation, upon detecting that the release switch 108 has been operated, the microcontroller/image processing engine 118 drives a geomagnetic sensor 117 and an acceleration sensor 116 so as to detect an image capturing orientation. The geomagnetic sensor 117 and the acceleration sensor 116 respectively detect geomagnetism and an acceleration, and output magnetic or acceleration values along three axes x, y and z in the form of digital values. By doing so, it is possible to detect geomagnetism and acceleration with three-dimensional vectors irrespective of the pose of the camera. Usually, the geomagnetic sensor 117 and the acceleration sensor 116 are driven on a regular basis such as before, after and during image capturing so as to output data. By subjecting the data to processing such as filtering and vector computation performed by the microcontroller/image processing engine 118, the image capturing orientation can be obtained.

As a method for computing an image capturing orientation, first, the microcontroller/image processing engine 118 detects the direction of gravity acceleration from the output of the acceleration sensor 116. As a result, a plane that is parallel to the ground is obtained. Next, the microcontroller/image processing engine 118 obtains the direction of geomagnetism from the output of the geomagnetic sensor 117. Furthermore, the microcontroller/image processing engine 118 obtains components, on the horizontal plane, of a geomagnetic vector and a vector indicating the known image capturing direction. By determining the angle formed between these, an image capturing orientation angle is obtained. The obtained image capturing orientation is the orientation with respect to the magnetic north. Accordingly, if the image capturing position is identified by GPS or the like, the microcontroller/image processing engine 118 may obtain the orientation with respect to the true north by converting the magnetic north to the true north by using image capturing position information.

The microcontroller/image processing engine 118 is configured to compute orientation on a regular basis such as before, after and during image capturing, but the computation of orientation is performed in asynchronous with image capturing, and thus one orientation data obtained at an appropriate timing during image capturing is used as the final image capturing orientation data for capturing an image. To be specific, during a series of image capture processing, image capturing takes place at the timing of exposure. For this reason, orientation data acquired at a timing closest to the exposure timing is employed as the image capturing orientation data for capturing an image. The image capturing orientation obtained in this way is associated with an image file obtained by the image capturing, and recorded in the recording apparatus 112 as a part of the image file.

As described above, in the present embodiment, the microcontroller/image processing engine 118 is configured to obtain an image capturing orientation, but the configuration is not limited thereto. For example, in the case where the lens optical axis is extremely upward or downward, it may be possible to, instead of determining the direction of the lens optical axis, determine an orientation with respect to another direction of interest such as a direction extending upward from the center of the image capture screen (a direction extending toward the sky along the vertical axis of the camera). Regardless of whether either direction component is determined, calculation of gravity acceleration using the acceleration sensor is necessary.

Hereinafter, operations of the electronic compass at the time of capturing a still image according to the first embodiment will be described with reference to FIGS. 2A and 3A. FIG. 2A is a diagram showing operations of the electronic compass when capturing a single-frame still image after a live view operation according to the first embodiment. The camera 120 according to the present embodiment defines the image capturing status according to the operations of each unit. FIG. 2A shows how the following three states are switched according to the operations of the camera. Specifically, the three states include an idle state in which the camera 120 is waiting for an instruction, a live view state in which images sequentially obtained by receiving light are displayed in real time on a display apparatus 115, and a still image capture state in which image capture processing is executed by driving the shutter and the like. First, when the camera 120 is turned on, the image capturing status is set to the idle state. At this time, the electronic compass is not working. When, at time t1, the user operates a switch or a menu to bring the camera 120 into a live view mode, the image capturing status is set to the live view state, and video is displayed in real time on the display apparatus 115. At the same time, the camera 120 starts operating the acceleration sensor 116 and the geomagnetic sensor 117 and regularly acquires acceleration information and geomagnetic information so as to operate the electronic compass. The camera 120 displays a compass that indicates the current image capturing orientation (the direction in which the lens is facing) so as to be superimposed on the live view video displayed on the display apparatus 115. If the release switch 108 is half-pressed by the user during the live view mode, the microcontroller/image processing engine 118 detects a high level of a SW1 signal. In response thereto, the camera 120 performs an AF/AE operation for capturing a still image, and determines the ISO speed, the shutter speed and the aperture value. At this time, the shutter 106 and the mirror 107 are not driven, and thus the output of the acceleration sensor 116 is not disrupted.

At time t2, if the user operates the release switch 108 (SW2 ON), a still image capturing operation starts. The camera 120 drives the mirror 107, and when the mirror 107 is fully open, the camera 120 drives the front and rear curtains of the mechanical shutter (the shutter 106), and thereby exposes a subject image on the image capturing sensor 105. After that, the camera 120 drives the shutter 106 and the mirror 107 in a reverse direction (charge operation) so as to prepare for the next image capturing (time t3). In this way, preparation for an AF/AE operation for the next image capturing is completed. After that, processing for transferring the captured image to the recording apparatus 112 starts. Upon completion of the transfer of the captured image, the still image capture state ends (time t4).

The camera 120 performs an electronic compass operation in parallel to the series of operations described above. At this time, while the shutter 106 and the mirror 107 are driven, vibrations are transmitted to the entire camera 120. The digital single-lens reflex camera includes, in addition to the shutter 106 and the mirror 107, other driven mechanical members such as the focus lens 101 and the diaphragm 103, and the entire digital single-lens reflex camera may be vibrated due to these members being driven. However, in the following description of the present embodiment, for the sake of simplicity, an example will be described in which a focus is given to highly influential vibrations caused by the shutter 106 and the mirror 107.

In response to the entire digital single-lens reflex camera being vibrated, the acceleration sensor 116 detects the vibration, and the output fluctuates significantly as indicated by "acceleration sensor output" shown in FIG. 2A. In the electronic compass function, the acceleration sensor 116 detects the gravity acceleration of the earth, and it is expected that the acceleration sensor 116 maintains a constant value unless the pose of the camera 120 is changed. If such a significantly fluctuating value of the acceleration sensor 116 is used to detect the image capturing orientation, irrespective of the fact that image capturing is performed in the same direction without changing the pose of the camera 120, an incorrect computation result as if the image capturing orientation has moved significantly is obtained. As a result, as indicated by "actual image capturing orientation" and "calculated image capturing orientation (computed as)" shown in FIG. 2A, the obtained image capturing orientation is different from the actual image capturing orientation.

However, the electronic compass according to the present embodiment is operated so as to reduce the influence of the operation of at least one movable unit such as the shutter 106, and thus the obtained image capturing orientation is close to the actual image capturing orientation as indicated by "calculated image capturing orientation" shown in FIG. 2A. FIG. 2A illustrates an example in which "calculated image capturing orientation" and "actual image capturing orientation" completely match with each other, but this merely indicates an ideal state in a conceptual manner, and thus the scope of the present embodiment also encompasses the case where "calculated image capturing orientation" and "actual image capturing orientation" do not completely match with each other.

FIG. 3A is a diagram showing detailed operations of the electronic compass according to the first embodiment, which corresponds to the state shown in FIG. 2A. Upon start of live view at time t1, the camera 120 regularly acquires raw output data of the acceleration sensor 116 and the geomagnetic sensor 117. In FIG. 3A, one set of data obtained at this time is represented as a square.

Before a still image capturing operation starts, the camera 120 performs filtering on the raw output data of the acceleration sensor 116 and the geomagnetic sensor 117 such as calculation of a moving average so as to appropriately remove noise superimposed on the data. After that, the camera 120 performs the above-described computation on the data from which noise has been removed (post-moving averaging data) so as to obtain image capturing orientation data.

When, at time t2, the user fully presses the release switch 108, the microcontroller/image processing engine 118 detects the high level of the SW2 signal, and the image capturing status is thereby changed from the live view state to the still image capture state. When still image capturing starts, the camera 120 uses post-moving averaging data (indicated by reference numeral 300 in FIG. 3A) acquired immediately before the still image capture state as pre-moving averaging data of the acceleration sensor 116, instead of using the raw output data. The camera 120 calculates the moving average with respect to the pre-moving averaging data, and thereby obtains data for use in computation of the image capturing orientation (post-moving averaging data). After that, the camera 120 performs the above-described computation on the post-moving averaging data, and thereby obtains image capturing orientation data.

The moving averaging processing is not a requirement. However, if the image capturing orientation is computed by replacing the raw output data acquired at the time of still image capturing with the raw output data acquired before the start of the still image capturing, the image capturing orientation may change drastically before and after the replacement. In contrast, performing moving averaging processing enables the image capturing orientation to be changed smoothly and continuously at a timing when the image capturing status is switched from the live view state to the still image capture state while appropriately removing noise. In the case where moving averaging processing is performed, the camera 120 obtains post-moving averaging data by calculating the average value of the raw output data (the pre-moving averaging data) of the acceleration sensor 116 obtained at N consecutive timings (where N is an integer of 2 or more, in the present embodiment, N is set to 4). Accordingly, the post-moving averaging data indicated by reference numeral 300 in FIG. 3A is the average value of four pieces of pre-moving averaging data corresponding to the last four timings before the start of still image capturing.

Also, post-moving averaging data at a predetermined timing during operation of the shutter 106 and the mirror 107 is calculated based on four pieces of pre-moving averaging data corresponding to the most recent four timings including this timing. In this case, among "the most recent four timings", at timings included in the period in which the shutter 106 and the mirror 107 perform operation, instead of the raw output data of the acceleration sensor 116, the post-moving averaging data indicated by reference numeral 300 is used as the pre-moving averaging data.

Upon completion of a series of still image capturing operations (time t4), the microcontroller/image processing engine 118 detects the completion of the still image capturing operations, and transitions the image capturing status again to the live view mode from the still image capture state. Also, the operation of the shutter 106 and the mirror 107 is completed prior to the completion of the still image capturing operations (time t3). Upon detecting the completion of the operation of the shutter 106 and the mirror 107, the microcontroller/image processing engine 118 performs control such that raw output data of the acceleration sensor 116 acquired at this time is used as the pre-moving averaging data of the acceleration sensor 116.

In this way, during the detection period shown in FIGS. 2A and 3A (the period from when SW2 is set to be ON to when the operation of the shutter 106 and the mirror 107 is completed), the camera 120 computes the image capturing orientation based on the acceleration data acquired immediately before the detection period. By doing so, the camera 120 can compute the image capturing orientation based on the acceleration data that is not affected by the influence of the vibration of the shutter 106 and the mirror 107 or the like. As a result, as shown in FIG. 2A, the calculated image capturing orientation substantially matches the actual image capturing orientation (as described above, they do not necessarily completely match with each other).

FIG. 4 is a flowchart illustrating operations of the camera 120 according to the first embodiment. The processing of this flowchart starts in response to the user performing a live view operation. In step S401, the microcontroller/image processing engine 118 starts a live view operation. In step S402, the microcontroller/image processing engine 118 determines whether or not the user has performed an operation to end the live view. If it is determined by the microcontroller/image processing engine 118 that the user has performed an operation to end the live view, the processing of the flowchart ends. Otherwise, the processing proceeds to step S404.

In step S404, the microcontroller/image processing engine 118 operates the geomagnetic sensor 117 and the acceleration sensor 116 at a predetermined interval so as to perform an electronic compass computation. The detailed description of the electronic compass computation has been given above with reference to FIGS. 2A and 3A. In step S405, the microcontroller/image processing engine 118 displays a compass on the display apparatus 115.

In step S406, the microcontroller/image processing engine 118 determines whether or not the user has fully pressed the release switch. If it is determined by the microcontroller/image processing engine 118 that the user did not fully press the release switch, the processing returns to step S402, and the microcontroller/image processing engine 118 repeats the same processing. Through this, the electronic compass computation is performed on a regular basis.

If it is determined by the microcontroller/image processing engine 118 in step S406 that the user fully pressed the release switch, the image capturing status is changed from the live view state to the still image capture state. In this case, in step S407, the microcontroller/image processing engine 118 operates the geomagnetic sensor 117 and the acceleration sensor 116 at a predetermined interval, as in step S404. In addition, in step S408, the microcontroller/image processing engine 118 replaces the pre-moving averaging data of the acceleration sensor 116 with the post-moving averaging data (see reference numeral 300 in FIG. 3A) acquired immediately before the still image capture state. In step S409, the microcontroller/image processing engine 118 performs an electronic compass computation. The electronic compass computation performed here is the same as that performed in step S404 except that the pre-moving averaging data is replaced with the post-moving averaging data acquired before image capturing. Also, in step S405 following step S404, a compass was displayed, but in step S409, a compass corresponding to the electronic compass computation performed in step S409 is not displayed because still image capturing is in progress in step S409 and thus the display apparatus 115 is turned off.

In step S410, the microcontroller/image processing engine 118 determines whether or not the operation of the shutter 106 and the mirror 107 has been completed. The microcontroller/image processing engine 118 determines that the operation of the shutter 106 and the mirror 107 has been completed by detecting that transfer of the captured image has started. If it is determined by the microcontroller/image processing engine 118 that the operation of the shutter 106 and the mirror 107 has not been completed, the processing returns to step S407, and the microcontroller/image processing engine 118 repeats the processing in step S407 and subsequent steps. Through this, during operation of the shutter 106 and the mirror 107, the electronic compass computation is performed based on the acceleration data that is not affected by the influence of the vibration of the shutter 106 and the mirror 107 or the like.

If it is determined by the microcontroller/image processing engine 118 in step S410 that the operation of the shutter 106 and the mirror 107 has been completed, the image capturing status returns to the live view state from the still image capture state. In this case, the processing returns to step S402, and the microcontroller/image processing engine 118 repeats the processing in step S402 and subsequent steps.

The camera 120 saves the image capturing orientation obtained through the electronic compass computation in association with the captured still image. The electronic compass computation is performed not only during image capturing, but also before and after the image capturing. It is considered that the image capturing orientation data obtained through the electronic compass computation performed during image capturing (in particular, during exposure) is closest to the actual image capturing orientation. Accordingly, the camera 120 associates the image capturing orientation data obtained through the electronic compass computation performed during image capturing with the still image. The raw output data of the acceleration sensor 116 obtained during image capturing may be affected by the influence of vibration, but as described above, the electronic compass computation according to the present embodiment is performed so as to reduce the influence of vibration.

As described above, according to the first embodiment, when the camera 120 performs the electronic compass computation during the operation of the movable units such as the shutter 106 and the mirror 107, the camera 120 uses the acceleration data obtained before the start of the operation. Accordingly, the reduction in the accuracy of the electronic compass caused by the operation of the movable units is suppressed.

Second Embodiment

A second embodiment will be described with reference to FIGS. 1, 2B and 3B. The basic configuration of a digital single-lens reflex camera (image capturing system) according to the second embodiment is the same as that of the first embodiment (see FIG. 1). Hereinafter, differences from the first embodiment will be mainly described.

In the first embodiment, the detection period ends at a timing when the driving of the shutter 106 and the mirror 107 is completed (time t3 shown in FIGS. 2A and 3A), and after that, the electronic compass uses the raw output data of the acceleration sensor 116.

However, in reality, even after completion of the driving of the shutter 106 and the mirror 107, the influence of vibration caused at the time of driving the shutter 106 and the mirror 107 is transmitted to the entire camera 120, as a result of which the camera 120 as a whole may be vibrated. This vibration gradually attenuates, but it takes time until the vibration is gone. For this reason, even if the driving of the shutter 106 and the mirror 107 is completed (time t3 shown in FIGS. 2B and 3B) and thereafter still image capturing is completed (time t4 shown in FIGS. 2B and 3B), the vibration may still remain. That is, even after completion of the driving of the shutter 106 and the mirror 107, the acceleration sensor 116 may be affected for a certain period of time (see "acceleration sensor output" shown in FIG. 2B).

In other words, in the first embodiment, under the assumption it is highly likely that the camera 120 is vibrated during the operation of the movable units, a configuration is used in which when the camera 120 performs the electronic compass computation during that period, the acceleration data to be used is replaced. However, the period during which the camera 120 is vibrated is not necessarily limited to during the operation of the movable units, and the camera 120 may be vibrated during a period other than during the operation of the movable units.

Figure 3B:
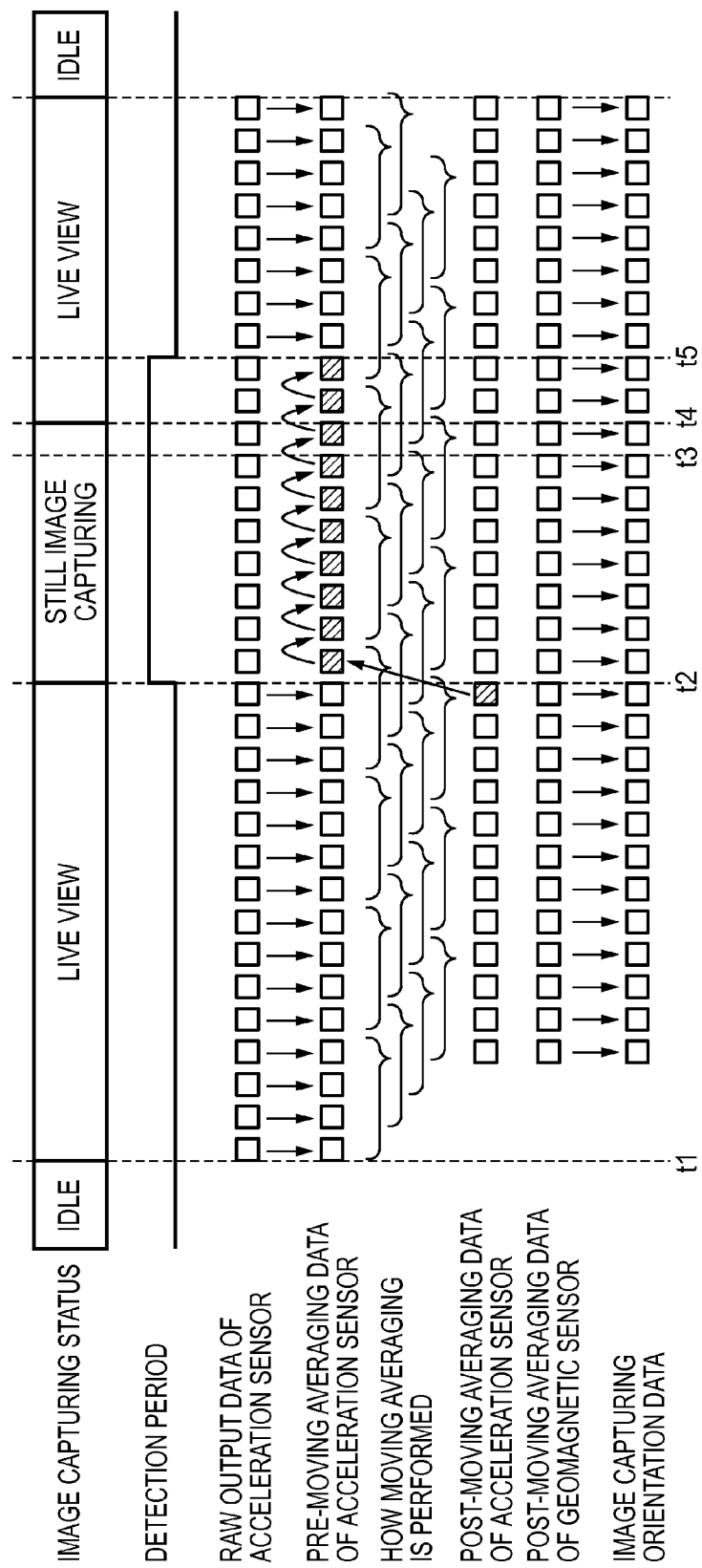
FIG. 3B is a diagram showing detailed operations of the electronic compass according to the second embodiment, which corresponds to the state shown in FIG. 2B.

To address this, in the second embodiment, the camera 120 ends the detection period when a predetermined period of time (time t5 shown in FIGS. 2B and 3B) passes after completion of the operation of the shutter 106 and the mirror 107 (time t3 shown in FIGS. 2B and 3B).

FIG. 3B is a diagram showing detailed operations of the electronic compass according to the second embodiment, which corresponds to the state shown in FIG. 2B. The detection period continues after completion of the driving of the shutter 106 and the mirror 107 (time t3) and even after completion of still image capturing (time t4). Accordingly, as indicated by hatched squares, the replacement of the data of the acceleration sensor 116 is continuously performed during a live view period that starts after completion of still image capturing. The microcontroller/image processing engine 118 waits for a predetermined period of time after the completion of the driving of the shutter 106 and the mirror 107, and if the microcontroller/image processing engine 118 determines that the vibration is no longer present, then the detection period ends. After that, the microcontroller/image processing engine 118 performs control so as to perform the electronic compass computation by using the latest raw output data of the acceleration sensor 116 in the same manner as before still image capturing. By doing so, noise that affects the output of the acceleration sensor 116 is appropriately removed during the detection period, and thus the image capturing orientation can be computed by using the acceleration data that is not affected by the influence of the vibration of the shutter 106 and the mirror 107. As a result, as indicated by "calculated image capturing orientation" in FIG. 2B, the calculated image capturing orientation substantially matches the actual image capturing orientation. It is also considered that through the above-described processing, the orientation data attached to an image obtained by the next image capturing is not affected. This is because it is often the case that after image capturing, the user views a REC review screen displayed for the user to check the captured image. Generally, the REC review screen temporarily shows, on the display apparatus 115, an image to be saved after image capturing, and returns to the live view screen when a predetermined period of time passes after the image is displayed. In many cases, the influence of vibration is gone at this time or while the user is viewing the REC review screen. That is, it is considered that the influence of vibration generated by the previous image capturing has already gone at the time when the next image capturing starts. Accordingly, the predetermined period of time timed after completion of driving may be in synchronization with the display time of the REC review screen. The predetermined period of time may of course be an empirically determined time.

FIG. 5 is a flowchart illustrating operations of the camera 120 according to the second embodiment. The processing of this flow chart starts in response to the user performing a live view operation.

The processing in steps S501 to S509 is the same as the processing in steps S401 to S409 shown in FIG. 4, and thus a description is omitted here.

In step S510, the microcontroller/image processing engine 118 determines whether or not a predetermined period of time has passed after completion of the operation of the shutter 106 and the mirror 107. Here, the microcontroller/image processing engine 118 determines the completion of the operation of the shutter 106 and the mirror 107 by detecting that transfer of the captured image has started. In short, in step S510, the microcontroller/image processing engine 118 determines whether or not a predetermined period of time has passed after transfer of the captured image started.

If it is determined by the microcontroller/image processing engine 118 that the predetermined period of time has not passed, the processing returns to step S507, and the microcontroller/image processing engine 118 repeats the same processing. By doing so, the electronic compass computation is performed based on the acceleration data that is not affected by the influence of the vibration of the shutter 106 and the mirror 107 or the like during operation of the shutter 106 and the mirror 107 and during the predetermined period of time after completion of the operation of the shutter 106 and the mirror 107.

In step S510, if it is determined by the microcontroller/image processing engine 118 that the predetermined period of time has passed, the processing returns to step S502, and the microcontroller/image processing engine 118 repeats the same processing.

The foregoing has been a description of the operations of the camera 120 according to the present embodiment.

As described above, according to the second embodiment, with respect to the acceleration data, the camera 120 uses, when performing the electronic compass computation during operation of the movable units such as the shutter 106 and the mirror 107 and during the predetermined period of time after completion of the operation of the movable units, the acceleration data obtained before the start of the operation of the movable units. Accordingly, the reduction in the accuracy of the electronic compass caused by the operation of the movable units is suppressed.

Third Embodiment

A third embodiment will be described with reference to FIGS. 1, 2C and 3C. The basic configuration of a digital single-lens reflex camera (image capturing system) according to the third embodiment is the same as that of the first embodiment (see FIG. 1). Hereinafter, differences from the first embodiment will be mainly described.

In the first embodiment, a case was described in which one still image is captured from the live view state, but in the third embodiment, a case will be described in which successive image capturing (processing for successively capturing a plurality of images) is performed from the idle state without passing through the live view state.

Referring to FIG. 2C, when the user half-presses the release switch 108 at time t1, the microcontroller/image processing engine 118 detects a high level of a SW1 signal, and changes the image capturing status from the idle state to an image capture preparation state. The camera 120 performs an AF/AE operation for still image capturing, and determines the ISO speed, the shutter speed and the aperture value. In parallel to this, the camera 120 causes the acceleration sensor 116 and the geomagnetic sensor 117 to perform operation so as to compute output, and thereby calculate the image capturing orientation on a regular basis. At this time, the shutter 106 and the mirror 107 are not driven, and thus the output of the acceleration sensor 116 is not disrupted.

When the user fully presses the release switch 108 at time t2, the microcontroller/image processing engine 118 detects a high level of a SW2 signal, and changes the image capturing status from the image capture preparation state to a still image capture state, and thereby still image capturing starts. The microcontroller/image processing engine 118 detects this timing, and starts a detection period shown in FIG. 2C. Upon start of still image capturing, the camera 120 drives the mirror 107, and when the mirror 107 is fully open, the camera 120 drives the front and rear curtains of the mechanical shutter (the shutter 106), and thereby exposes a subject image on the image capturing sensor 105. As this time, as in the first embodiment, the output of the acceleration sensor 116 is disrupted as a result of the shutter 106 and the mirror 107 being driven. If the user is still pressing the release switch 108 after completion of the first image capturing, the camera 120 starts an operation for capturing the next frame. The camera 120 performs, in the same manner as with the first image capturing, an AF/AE operation, determines the ISO speed, the shutter speed and the aperture value, and drives the shutter 106 and the mirror 107 so as to capture a second image.

In the present embodiment, a case is described in which four frames are successively captured as an example, and the same processing is performed on the third and fourth frames. The user stops pressing of the release switch 108 while the fourth frame is captured, and the SW2 signal turns to a low level. After that, the driving of the shutter 106 and the mirror 107 ends, but the vibration of the camera 120 as a whole may still exist. In short, for a predetermined period of time after the completion of the operation of the shutter 106 and the mirror 107, there is an influence of the vibration on the acceleration sensor 116.

Accordingly, in the present embodiment as well, as in the second embodiment, the camera 120 ends the detection period when a predetermined period of time passes (time t8) after completion of the driving of the shutter 106 and the mirror 107 (time t6).

The camera 120 saves the image capturing orientation obtained through the electronic compass computation in association with the captured still images. The electronic compass computation is performed not only during image capturing, but also before and after the image capturing, but it is considered that the image capturing orientation data obtained through the electronic compass computation performed during image capturing (in particular, during exposure) is closest to the actual image capturing orientation. However, even if the image capturing orientation data immediately before the image capturing operation starts is associated with the still image, the error is not practically a serious problem.

FIG. 3C is a diagram showing detailed operations of the electronic compass according to the third embodiment, which corresponds to the state shown in FIG. 2C. In FIG. 3C, the image capturing orientation data to be associated with the first captured image data corresponds to the timing of the post-moving averaging data of the acceleration sensor 116 indicated by reference numeral 301. At this timing, the shutter 106 and the mirror 107 do not perform operation, and thus the acceleration sensor 116 does not receive the influence of vibration. That is, as the image capturing orientation data for capturing a first still image frame, image capturing orientation data calculated by an ordinary computation method can be used.

However, as the image capturing orientation data for capturing a second still image frame, the image capturing orientation data computed at the last timing (immediately before time t3) in the first frame capturing operation is used, and thus the image capturing orientation data is affected by the influence of vibration of the shutter 106 and the mirror 107 generated during the first frame capturing operation. Even if the operation of the shutter 106 and the mirror 107 has been completed at this timing, the camera 120 as a whole may still be affected by the influence of vibration. For this reason, if the image capturing orientation is computed by using the value of the acceleration sensor 116 obtained at this timing, it is not possible to calculate the correct orientation. The same is true for a third frame and a fourth frame, and these frames are also affected by the influence of vibration of the shutter 106 and the mirror 107 generated during the previous frame capturing operation.

To address this, in FIG. 3C, during still image capturing, the camera 120 replaces the pre-moving averaging data of the acceleration sensor 116 with the post-moving averaging data (indicated by reference numeral 301 in FIG. 3C) obtained immediately before the start of the still image capturing. As described above, the camera 120 sets a time period from during successive image capturing of four still image frames to the end of vibrations after the successive image capturing as the detection period, and uses the post-moving averaging data indicated by reference numeral 301 during this period. The camera 120 can thereby calculate the image capturing orientation data without receiving the influence of vibration.

On the other hand, there are cases where successive still image capturing is performed while moving the camera 120 according to the movement of the subject. In this case, the computation of the electronic compass may not be correctly performed if the pose of the camera 120 is not correctly obtained during successive still image capturing. However, in the case of moving the camera 120 according to the movement of the subject, it is often the case that the camera 120 is moved along a horizontal plane parallel to the ground. In this case, even if the correct direction of gravity acceleration is not obtained during successive still image capturing, the data of the acceleration sensor 116 obtained immediately before still image capturing can be used. That is, during image capturing, the camera 120 can compute a substantially correct image capturing orientation by using the latest data only with respect to data of the geomagnetic sensor 117.

Figure 6:
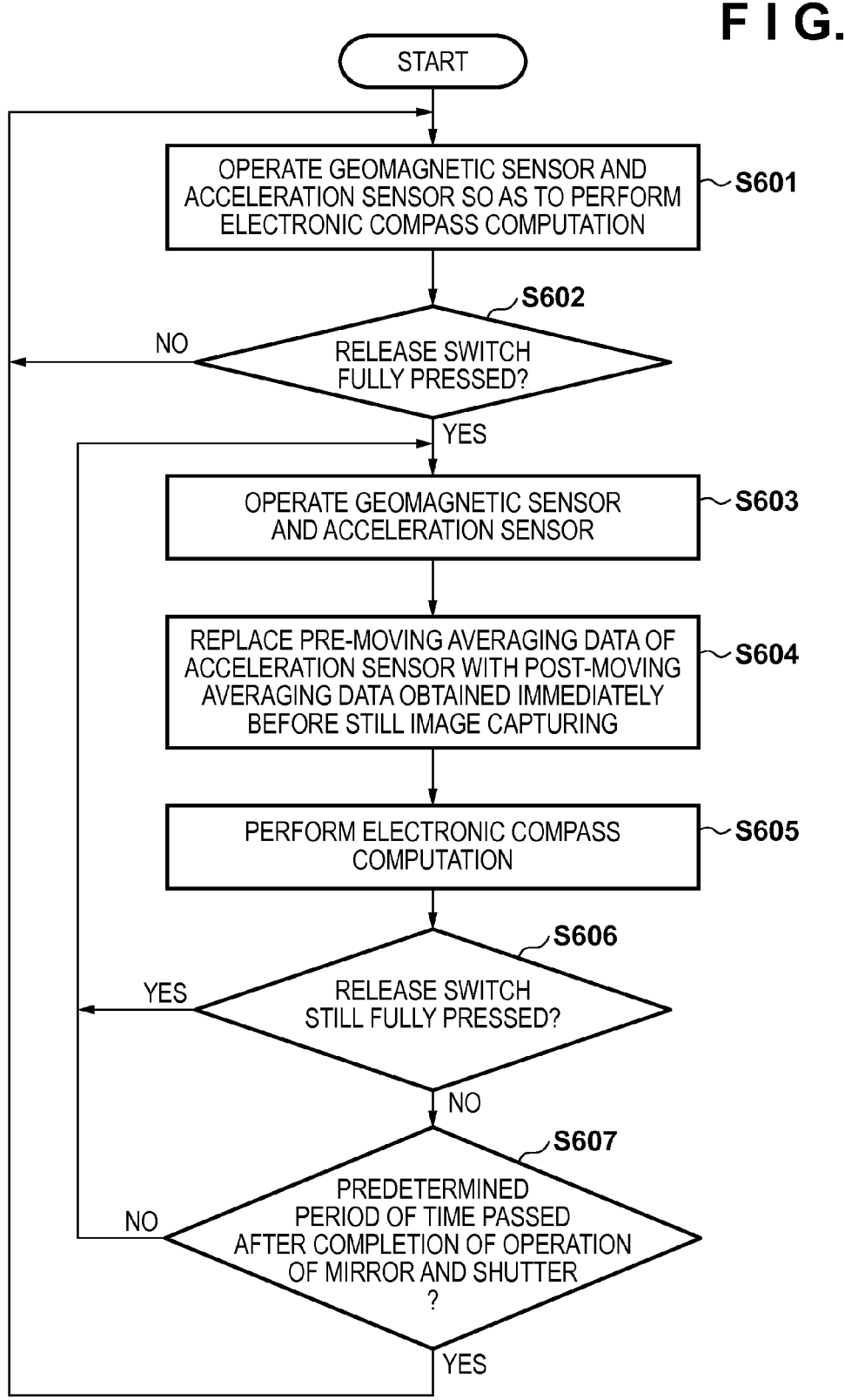
FIG. 6 is a flowchart illustrating operations of a camera 120 according to the third embodiment.

FIG. 6 is a flowchart illustrating operations of the camera 120 according to the third embodiment. The processing of this flowchart starts in response to the user pressing the release switch so as to turn the SW1 to be on.

The processing in step S601 is the same as the processing in step S404 shown in FIG. 4. Specifically, at this time, the orientation is calculated by using the output from the acceleration sensor 116.

The processing in step S602 is the same as the processing in step S406 shown in FIG. 4. If it is determined in step S602 that the user did not fully press the release switch, the processing returns to step S601, and the processing in steps S601 to S602 is repeated. If it is determined in step S602 that the user fully pressed the release switch, the processing proceeds to step S603.

The processing in steps S603 to S605 is the same as the processing in steps S407 to S409 shown in FIG. 4.

Next, in step S606, the microcontroller/image processing engine 118 determines whether or not the user is still fully pressing the release switch. If it is determined that the user is still fully pressing the release switch, the processing returns to step S603, and the processing in steps S603 to S606 is repeated. Along with this processing, the successive image capture processing is continued. In short, in parallel to the repetition of steps S603 to S606, image capturing is executed at a predetermined successive image capturing interval. In other words, during successive still image capturing, the orientation data is calculated by replacing the pre-moving averaging data of the acceleration sensor 116 with post-moving averaging data obtained immediately before the start of the still image capturing.

If it is determined in step S606 that the user is not fully pressing the release switch, the repetition of steps S603 to S606 ends, and the processing proceeds to step S607. In short, the successive image capture processing ends.

In step S607, the same processing as that of step S510 shown in FIG. 5 is executed. If the processing returns from step S607 to step S603, the processing in steps S603 to S607 is repeated. However, unlike the case where the processing returns from step S606 to step S603, successive image capture processing is not performed.

The foregoing has been a description of the operations of the camera 120 according to the present embodiment.

As described above, according to the third embodiment, with respect to the acceleration data, the camera 120 uses, when performing the electronic compass computation during successive still image capturing and during a predetermined period of time after completion of the operation of the movable units, the acceleration data obtained before the start of successive image capturing. Accordingly, the reduction in the accuracy of the electronic compass caused by the operation of the movable units is suppressed.

Fourth Embodiment

A fourth embodiment will be described with reference to FIGS. 1, 2D and 3D. The basic configuration of a digital single-lens reflex camera (image capturing system) according to the fourth embodiment is the same as that of the first embodiment (see FIG. 1). Hereinafter, differences from the first embodiment will be mainly described.

In the first embodiment, a case was described focusing on the shutter 106 and the mirror 107 provided within the camera 120 as the vibration source (movable unit). However, vibrations of the image capturing lens 100 also affect the acceleration sensor 116. Mechanical movements of the image capturing lens 100 include AF driving, diaphragm driving, driving of a vibration isolator, and the like. Of these, the vibration isolator performs operation so as to suppress vibrations, and thus it does not contribute to increasing the vibrations of the entire camera 120. In addition, the diaphragm driving is performed at substantially the same time as the operation of the mirror 107, and thus by detecting the operation period of the mirror 107, the diaphragm driving can be handled.

With respect to AF driving, on the other hand, although vibrations generated by AF driving is small, the vibrations are generated at a timing different from the driving timing of the shutter 106 and the mirror 107. Accordingly, it may be necessary to separately detect the timing so as to perform correction. To this end, in the fourth embodiment, a configuration for suppressing the reduction in the accuracy of the electronic compass caused by the operations of the focus lens 101, the shutter 106 and the mirror 107 will be described.

Referring to FIG. 2D, when the user half-presses the release switch 108 during the live view state, the microcontroller/image processing engine 118 detects a high level of a SW1 signal, and AF driving is thereby started (time t1). At this time, still image capturing is not yet performed. At this time, as a result of the focus lens 101 being driven during AF, a slight influence of vibration is found in the output of the acceleration sensor 116. Accordingly, if the raw output data of the acceleration sensor 116 is used to perform electronic compass computation, the resulting image capturing orientation contains a slight influence of vibration. To address this, after the start of AF operation, the camera 120 replaces the pre-moving averaging data of the acceleration sensor 116 with the post-moving averaging data obtained immediately before the start of AF operation.

There are cases where the influence of vibration of the shutter 106 and the mirror 107 ends at substantially the same timing as the completion of still image capturing (time t2). Accordingly, in the present embodiment, the microcontroller/image processing engine 118 ends the detection period upon detection of completion of still image capturing. That is, as shown in FIG. 2D, the microcontroller/image processing engine 118 sets a time period from the detection of the high level of the SW1 signal to the end of still image capturing as the detection period, and replaces the data of the acceleration sensor 116.

Figure 3D:
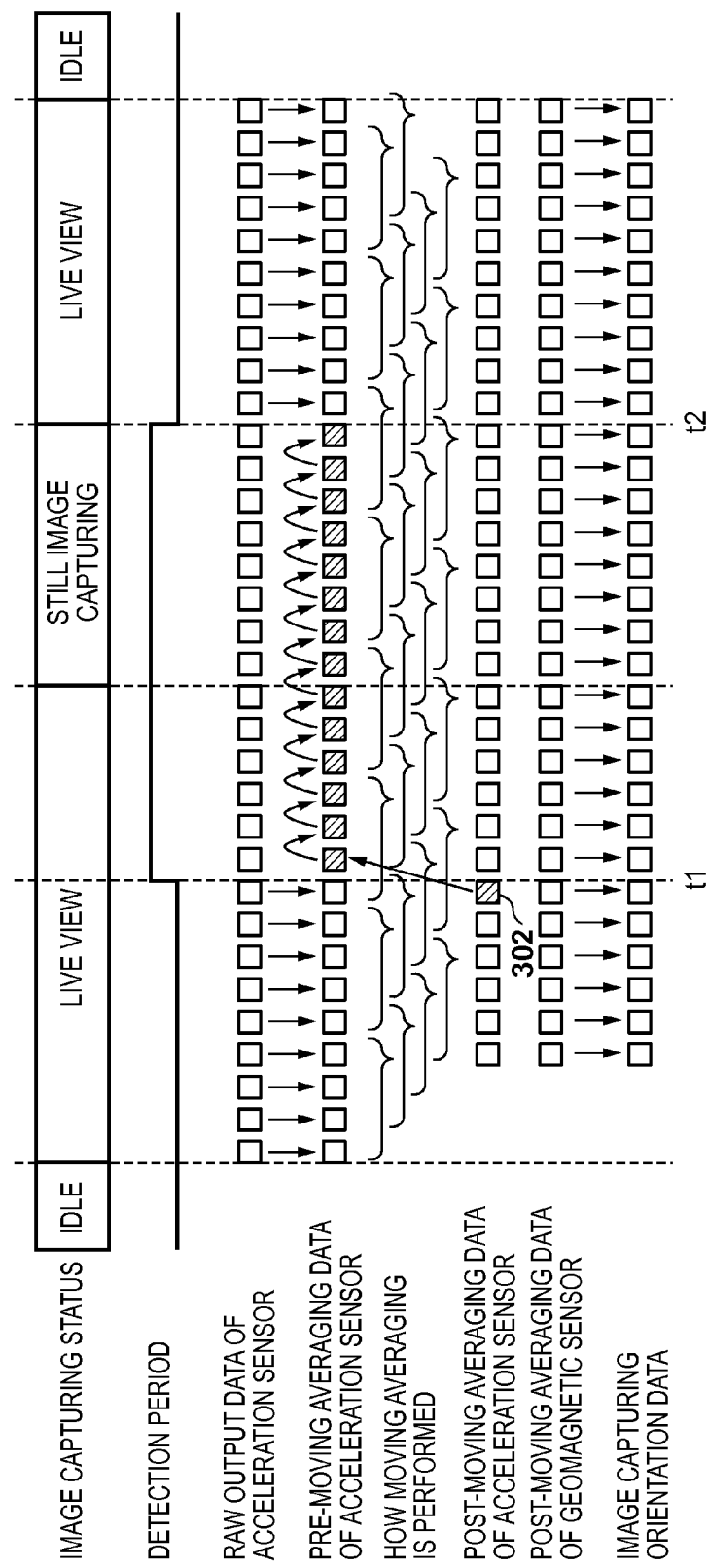
FIG. 3D is a diagram showing detailed operations of the electronic compass according to the fourth embodiment, which corresponds to the state shown in FIG. 2D.

FIG. 3D is a diagram showing detailed operations of the electronic compass according to the fourth embodiment, which corresponds to the state shown in FIG. 2D. During the period from the start of AF operation (time t1) to the end of still image capturing (time t2), the camera 120 replaces the pre-moving averaging data of the acceleration sensor 116 with post-moving averaging data obtained immediately before the start of AF operation (indicated by reference numeral 302 in FIG. 3D). The camera 120 can thereby calculate the image capturing orientation data without receiving the influence of vibration.

A flowchart illustrating operations of the camera 120 according to the fourth embodiment is the same as that shown in FIG. 4 except that the processing in steps S406 and step S410 is different, and thus an illustration of the flowchart is omitted. A difference is that, in step S406, the microcontroller/image processing engine 118 determines whether or not the user half-pressed the release switch instead of determining whether or not the user fully pressed the release switch. In short, it is determined whether or not a high level of a SW1 signal has been detected. Another difference is that, in step S410, the microcontroller/image processing engine 118 determines whether or not still image capturing has been completed instead of determining whether or not the operation of the shutter 106 and the mirror 107 has been completed.

As described above, according to the fourth embodiment, with respect to the acceleration data, the camera 120 uses, when performing the electronic compass computation while vibrations caused by the operation of the focus lens 101, the shutter 106 and the mirror 107 exist, the acceleration data obtained before the start of the operation of these units. Accordingly, the reduction in the accuracy of the electronic compass caused by the operation of the movable units is suppressed.

Other Embodiments

In the embodiments described above, an example was described in which, in step S410 shown in FIG. 4, the microcontroller/image processing engine 118 uses the result of detection as to whether or not transfer of the captured image has started, so as to determine whether or not the operation of the shutter 106 and the mirror 107 has been completed. However, other criteria may be used as long as it is possible to determine whether or not the operation of the shutter 106 and the mirror 107 has been completed. For example, it is possible to use a configuration in which whether or not the operation of the shutter 106 and the mirror 107 has been completed is determined by monitoring the status of power supply for driving the shutter 106 and the mirror 107, or a configuration in which whether or not the operation of the shutter 106 and the mirror 107 has been completed is determined by monitoring the voltage or current of signal lines that transmit control signals for causing the shutter 106 and the mirror 107 to perform operation.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2014-099832, filed May 13, 2014 which is hereby incorporated by reference herein in its entirety.

What is claimed is:

1. An image capturing apparatus including a movable unit configured to operate so as to perform image capturing, the image capturing apparatus comprising:
    an acceleration detection unit configured to detect an acceleration of the image capturing apparatus;
    a geomagnetic detection unit configured to detect geomagnetism; and
    a determining unit configured to determine a direction of the image capturing apparatus by using the acceleration detected by the acceleration detection unit and the geomagnetism detected by the geomagnetic detection unit;
    wherein the determining unit is configured to, when determining the direction of the image capturing apparatus at a predetermined timing during an operation period of the movable unit, determine the direction of the image capturing apparatus by using the acceleration detected by the acceleration detection unit before start of the operation period of the movable unit and the geomagnetism detected by the geomagnetic detection unit during the operation period of the movable unit.

2. The image capturing apparatus according to claim 1, wherein the operation period includes a period from when the movable unit starts operation to when the movable unit completes the operation.

3. The image capturing apparatus according to claim 1, wherein the operation period includes a period from when the movable unit starts operation to when a predetermined period of time passes after completion of the operation.

4. The image capturing apparatus according to claim 3, further comprising a display control unit configured to perform control so as to display captured data on a display unit for a limited period of time in response to completion of image capturing,
    wherein the predetermined period of time is in synchronization with the limited period of time.

5. The image capturing apparatus according to claim 1,
    wherein the image capturing apparatus has a function of successively capturing a plurality of images, and
    the operation period includes a period from when the movable unit starts an operation for first image capturing to when a predetermined period of time passes after the movable unit completes an operation for final image capturing.

6. The image capturing apparatus according to claim 1,
    wherein the operation period includes a period from when the movable unit starts an operation for image capturing to when the movable unit completes the image capturing.

7. The image capturing apparatus according to claim 1,
wherein the acceleration detection unit is configured to regularly detect the acceleration of the image capturing apparatus, and
the determining unit is configured to, when determining the direction of the image capturing apparatus at the predetermined timing, make the determination by using an average value of N accelerations detected by the acceleration detection unit from the last N timings before the start of the operation period, where N is an integer of 2 or more.

8. The image capturing apparatus according to claim 1,
wherein the acceleration detection unit is configured to regularly detect the acceleration of the image capturing apparatus,
the determining unit is configured to, when determining the direction of the image capturing apparatus at the predetermined timing, make the determination by calculating an average value of N accelerations detected by the acceleration detection unit from the most recent N timings including the predetermined timing, where N is an integer of 2 or more, and using the average value, and
the determining unit is configured to, when calculating the average value, with respect to an acceleration corresponding to a timing included in the operation period among the N accelerations, use an average value of N accelerations detected by the acceleration detection unit from the last N timings before the start of the operation period instead of the acceleration detected by the acceleration detection unit.

9. The image capturing apparatus according to claim 1,
wherein the movable unit includes at least one of a focus lens, a shutter and a mirror.

10. A control method for controlling an image capturing apparatus including a movable unit configured to operate so as to perform image capturing, the control method comprising:
detecting an acceleration of the image capturing apparatus;
detecting geomagnetism; and
determining a direction of the image capturing apparatus by using the detected acceleration and the detected geomagnetism;
wherein when determining the direction of the image capturing apparatus at a predetermined timing during an operation period of the movable unit, the direction of the image capturing apparatus is determined by using the acceleration detected before start of the operation period of the movable unit and the geomagnetism detected during the operation period of the movable unit.

11. A non-transitory computer-readable storage medium storing a program for causing a computer to execute the control method according to claim 10.

* * * * *